United States Patent [19]
Percifield

[11] 3,943,785
[45] Mar. 16, 1976

[54] AIR COOLED BELT CLUTCH
[75] Inventor: Edward K. Percifield, Indianapolis, Ind.
[73] Assignee: Carlisle Corporation, Cincinnati, Ohio
[22] Filed: Apr. 26, 1974
[21] Appl. No.: 464,339

[52] U.S. Cl. .......... 74/242.12; 74/230.01; 74/230.6; 56/11.6; 74/226
[51] Int. Cl.².. F16H 7/10; F16H 7/14; A01D 69/08
[58] Field of Search ......... 192/11, 113 A; 74/230.6, 74/230.01, 230.5, 230.8, 230.3, 219, 226, 227, 242.1, 242.12; 56/11.6, 11.7, 11.8

[56] References Cited
UNITED STATES PATENTS

| | | | |
|---|---|---|---|
| 555,924 | 3/1896 | Brigel | 74/230.3 |
| 1,385,396 | 7/1921 | Rayburn | 74/230.6 |
| 2,057,435 | 10/1936 | Kimble | 74/230.01 |
| 2,707,402 | 5/1955 | Blair | 74/230.01 |
| 2,746,587 | 5/1956 | Spase | 192/113 A |
| 2,957,561 | 10/1960 | Musgrave | 192/11 |
| 2,960,810 | 11/1960 | Musgrave | 56/25.4 |
| 3,015,237 | 1/1962 | Musgrave | 74/242.1 R |

FOREIGN PATENTS OR APPLICATIONS

| | | | |
|---|---|---|---|
| 481,163 | 5/1953 | Italy | 74/230.5 |

Primary Examiner—Samuel Scott
Assistant Examiner—A. Russell Burke
Attorney, Agent, or Firm—Jenkins, Hanley & Coffey

[57] ABSTRACT

A drive system comprising a prime mover such as an engine providing a drive shaft, a shell supported by the shaft for rotation relative to the shaft, a split groove pulley mounted on the shaft, the pulley including one flange secured to the shaft for rotation therewith and a complementary flange connected to the shell for rotation therewith, the flanges defining a space axially therebetween, an adjustably movable take-up pulley having a belt-tightening position and a belt-loosening position, and a belt trained about the pulleys. When the belt is tightened by the take-up pulley, the shell and complementary flange rotate with the shaft and the said one flange, i.e., the belt provides a driving connection between the two flanges. When the belt is loosened, the driving connection is broken such that the one flange and shaft rotate relative to the complementary flange and the shell. The said one flange provides means for drawing air into the space between the flanges for cooling the belt when the shaft is driven and for providing air flow which positions the belt when it is loosened away from the rotating flange.

4 Claims, 3 Drawing Figures

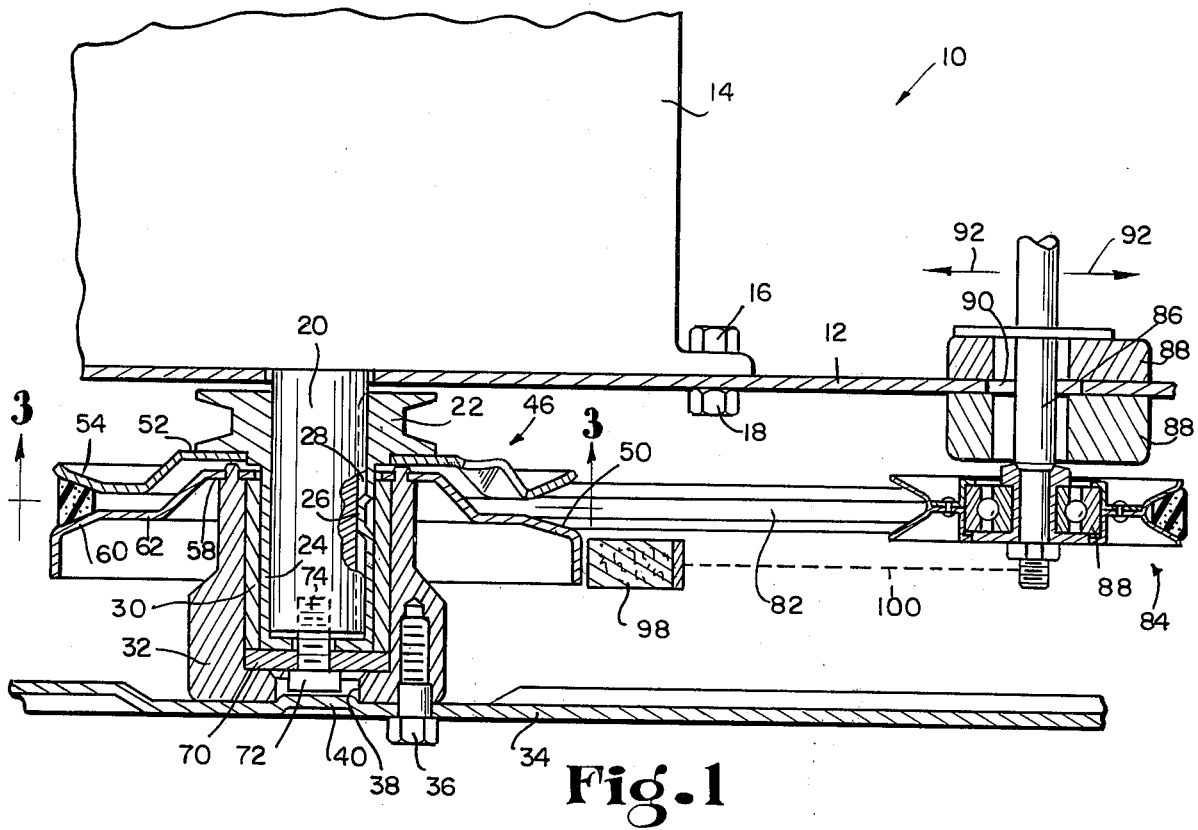

AIR COOLED BELT CLUTCH

The present invention relates to clutching devices, and more particularly to belt clutches of the type disclosed and claimed in U.S. Pat. No. 2,957,561 issued Oct. 25, 1960 to Orly Musgrave. Such belt clutches comprise a drive shaft, a split groove pulley mounted on the shaft, the pulley including one flange secured to the shaft for rotation therewith and a complementary flange which rotates relative to the shaft and which may be drivingly connected, for instance, to another element. A belt is trained about that split groove pulley and means is provided for tightening and loosening the belt. When the belt is tight, the belt provides a driving connection between the two flanges such that the complementary flange is driven with the flange secured to the shaft. When the belt is loosened, the complementary flange is not driven by the flange which is secured to the shaft.

The Orly Musgrave U.S. Pat. No. 2,957,561 discloses such a clutch arrangement for use on a riding lawn mower comprising an engine, the drive shaft of which extends downwardly through an opening in the frame of the mower. A shell is mounted on the drive shaft for rotation relative to the shaft. A grass cutting blade is mounted on the shell for rotation therewith. Then, a split groove pulley is mounted on the shaft above the shell, the pulley including an upper flange secured to the shaft for rotation therewith and a lower or complementary flange secured to the shell for rotation therewith. The flanges, of course, define a space axially therebetween. A second pulley and means for mounting the second pulley on the frame for movement toward and away from the first-mentioned pulley between a belt-tightening position and a belt-loosening position are provided. A belt is trained about the pulleys whereby, when the second pulley is in its belt-tightening position, the shell and lower flange and blade rotate with the upper flange and shaft and, when the second pulley is in its loosening position, the driving connection between the upper and lower flanges is broken and the belt is out of engagement with the upper flange. Generally, another pulley is used drivingly to connect the drive shaft to the transmission for the lawn mower.

For safety reasons, when the belt is loosened, a brake is moved against the lower pulley flange to keep that flange and the blade from rotating. This means that the lower flange and blade and, in fact, the belt are stationary when the upper flange and drive shaft are driven at speeds of from 800 rpm to 1,000 rpm during idling and even higher speeds during running or moving of the mower to the place of cutting. Such engines generally run between 2,500 rpm and 2,800 rpm during running and cutting operations.

Each of the flanges has a radially inner annular portion, a radially outer annular portion and an intermediate annular portion therebetween. The belt is engageable with the outer annular portions when it is in its tightened condition. When the belt is in its loosened condition, it rests upon the outer annular portion of the lower flange to provide a narrow space between the belt and the outer annular portion of the upper flange which is rotating.

In prior art systems, problems have developed when the belt is in its loosened condition and stationary on the stopped lower flange. The problems involve contacting of the stationary belt to the rotating upper flange. This contacting or rubbing action of the upper pulley flange heats the belt and causes a compound to cook out of the belt. This compound, which is sticky, actually sticks the belt to the pulley flanges, making it difficult to disengage the clutch. Further, excessive heating shrinks the belt to aggravate the problem of the sticky compound.

It is an object of my present invention to provide a flow of air that will cool the belt while it is standing still and which will position the belt downwardly away from the upper pulley flange which is rotating. Specifically, my objective is to cool the belt while it is standing still, which is significantly different from cooling a belt and pulley while running. I am aware of prior art which shows air scoops or serrations for cooling a pulley and belt which generate heat when the belt is driven at high speeds about the pulley. U.S. Pat. No. 2,707,402 issued May 3, 1955; No. 2,850,852 issued Sept. 9, 1958; and No. 3,229,424 issued Jan. 18, 1966 are representative of such prior art.

While my present invention provides cooling air which will tend to cool the belt when the belt clutch is engaged, that is not the primary reason why I provide such a cooling means or air flow means.

An object of my invention, therefore, is to provide such a belt clutch in which the upper flange or the flange which is driven by the shaft is provided with means for drawing air into the space between the flanges for cooling the belt when the shaft is driven and particularly when the lower flange or complementary flange and belt are stationary when the shaft is driven.

Another object of my invention is to provide such an air drawing means which will provide an air flow tending to hold the stationary belt out of contact with the rotating upper flange.

Other objects and features of my present invention will become apparent as this description progresses.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:

FIG. 1 is a fragmentary sectional view showing the belt clutch of the present invention in a riding lawn mower environment;

FIG. 2 is a sectional view showing the clutch in the disengaged condition; and

FIG. 3 is a fragmentary sectional and enlarged view taken generally along the lines 3—3 in FIG. 1.

Referring now particularly to the drawings, it will be seen that I have shown a portion of a lawn mower 10 comprising a frame 12 upon which an engine 14 is mounted and held stationary thereon by means such as the illustrated bolt 16 and nut 18. The engine 14 provides a drive shaft 20 which extends vertically downwardly under the mower and upon which a pulley 22 is mounted for rotation with the shaft. This pulley 22 may be connected by a belt (not shown) to the transmission of the wheel drive unit of the mower (also not shown). In the illustrative embodiment, the pulley 22 is formed with a downwardly extending cylindrical sleeve 24 receiving the distal end of the shaft 20 and an indentation or protrusion 26 which extends into the keyway 28 of the shaft to cause the pulley 22 to rotate with the shaft. A bearing sleeve 30 is mounted upon the downwardly extending sleeve 24 and a cylindrical shell 32 is mounted upon that sleeve 30. In the illustrative embodiment, a blade 34 is fastened to the shell 32 by means such as the illustrated screw 36. The shell 32, in the illustration, has a concentric bore 38 in its lower end which receives a central raised portion 40 of the blade to center the blade. Such structure, of course, is merely illustrative in that the blade 34 may be connected to the shell 32 by any number of conventional techniques.

Then, a split groove pulley 46 is mounted on the shaft 20, the pulley including an upper flange 48 which is secured to the shaft 20 for rotation therewith and a lower flange 50 which is secured to the shell 32 for rotation therewith. In other words, the lower flange 50 and the shell 32 will rotate independently of the shaft 20. The upper flange 48 has an inner annular portion 52, outer annular portion 54, and intermediate annular portion 56 while the lower flange 50 has an inner annular portion 58, outer annular portion 60, and intermediate annular portion 62. Also, the lower flange 50 is provided with a peripherally and downwardly extending flange portion 64 against which a brake operates as will be discussed hereinafter. Lugs, such as indicated at 66, drivingly connect the lower flange 50 to the shell 32, the lugs 66 extending upwardly through openings formed in the flange 50.

In the illustrative embodiment, the bearing 30 and shell 32 are secured against axial movement downwardly off the shaft 20 by means of a bearing end plate 70 which is secured to the shaft 20 by means of a screw 72 which is threaded axially upwardly into the end of the shaft as indicated at 74.

A belt 82 is trained about the pulley 46 and another pulley 84 which is bearing mounted on a shaft 86 disposed in mounts 88 on the frame 12 such that the shaft 86 extends through an opening 90 in the frame. The opening 90 is elongated such that the pulley 84 can move toward and away from the axis of the shaft 20 as indicated by the arrows 92. In other words, the pulley 84 is adjustably movable between its belt-tightening position and belt-loosening position. Any number of means may be used for holding the pulley 84 in its two positions. Such means are disclosed in the Musgrave U.S. Pat. No. 2,957,561 mentioned above.

Also, as disclosed in the Musgrave U.S. Pat. No. 2,957,561, a brake 98 is connected to the pulley 84 as indicated at 100 such that, when the pulley 84 is in its belt-loosening position, the brake 98 is engaged with the downwardly extending flange 64 to stop the flange 50 of the pulley 46 and more importantly, to stop the blade 34 from rotating with the shaft 20.

In the illustrative embodiment, the intermediate annular portion 56 of the upper pulley flange 48 is formed with a plurality of air scoops 108 which draw air into the space between the pulley flanges to cool the belt 82 and to position the belt 82 downwardly against the outer annular portion 60 of the lower flange 50 when the belt is loosened. Particularly, a part of the air drawn into the axial space between the flanges 48, 50 is exhausted radially outwardly through the narrow space between the belt and the outer annular portion 54 of the upper flange as indicated by the arrows 116. This movement of the air keeps the belt out of engagement with the rotating upper flange to stop any rubbing action which would generate heat in the belt. The movement of the air also cools the belt.

Each of the scoops 108 is a peripherally extending depression opening toward the space between the pulley flanges 48 and 50 and the forward end of which is open as indicated at 110, i.e., the end facing the direction of rotation.

I claim:

1. In a drive system including an engine providing a drive shaft, a shell supported by said shaft for rotation relative to said shaft, a split groove pulley on said shaft, said pulley including one flange secured to the shaft for rotation therewith and a complementary flange connected to said shell for rotation therewith, said flanges defining a space axially therebetween, an adjustably movable take-up pulley having a belt-tightening position and a belt-loosening position, and a belt trained about said pulleys whereby, when said belt is tightened by said take-up pulley, said shell and complementary flange rotate with said shaft and said one flange, the improvement in which said one flange provides means for drawing air into said space between said flanges for cooling said belt when said shaft is driven, each said flange including a radially inner annular portion, a radially outer annular portion and an intermediate annular portion therebetween, said belt, in its loosened condition, being engaged with the radially outer annular portion of said complementary flange and out of engagement with said one flange and said belt, in its tightened condition, being engaged with both radially outer annular portions, said air drawing means being positioned to draw air into the space between said intermediate portions, a part of which air escapes from said space radially outwardly to flow between the radially outer portion of said one flange and said belt when said belt is in its loosened condition, thereby to hold said belt out of engagement with said one flange.

2. The improvement of claim 1 in which the intermediate annular portion of said one flange is formed to provide a plurality of air scoops serving as said air drawing means.

3. The improvement of claim 1 in which each said scoop is a peripherally extending depression opening toward the space between said flanges and open at one end facing the direction of rotation of said one flange.

4. In a drive system including an engine providing a drive shaft, a shell supported by said shaft for rotation relative to said shaft, a split groove pulley on said shaft, said pulley including one flange secured to the shaft for rotation therewith and a complementary flange connected to said shell for rotation therewith, said flanges defining a space axially therebetween, an adjustably movable take-up pulley having a belt-tightening position and a belt-loosening position, and a belt trained about said pulleys whereby, when said belt is tightened by said take-up pulley, said shell and complementary flange rotate with said shaft and said one flange, the improvement in which said one flange provides means for drawing air into said space between said flanges for cooling said belt when said shaft is driven, said air drawing means and said flanges being disposed to direct a part of the air drawn into said space radially outwardly to flow between said one flange and said belt when said belt is in its loosened condition thereby to hold said belt out of engagement with said one flange.

* * * * *

UNITED STATES PATENT OFFICE
CERTIFICATE OF CORRECTION

Patent No. 3,943,785                    Dated March 16, 1976

Inventor(s) Edward K. Percifield

It is certified that error appears in the above-identified patent and that said Letters Patent are hereby corrected as shown below:

Column 4, line 42, change "claim 1" to --claim 2--.

Column 4, line 64, after "condition" insert --,--.

Signed and Sealed this fifteenth Day of June 1976

[SEAL]

Attest:

RUTH C. MASON
Attesting Officer

C. MARSHALL DANN
Commissioner of Patents and Trademarks